US012693144B2

(12) United States Patent
Huijzer

(10) Patent No.: US 12,693,144 B2
(45) Date of Patent: Jul. 28, 2026

(54) METHOD FOR OPERATING AN ULTRASONIC FLOWMETER AND ULTRASONIC FLOWMETER

(71) Applicant: KROHNE AG, Basel (CH)

(72) Inventor: Arie Huijzer, Sliedrecht (NL)

(73) Assignee: Krohne AG, Basel (CH)

( * ) Notice: Subject to any disclaimer, the term of this patent is extended or adjusted under 35 U.S.C. 154(b) by 256 days.

(21) Appl. No.: 18/458,463

(22) Filed: Aug. 30, 2023

(65) Prior Publication Data

US 2024/0077345 A1 Mar. 7, 2024

(30) Foreign Application Priority Data

Sep. 1, 2022 (DE) ..................... 10 2022 122 181.4

(51) Int. Cl.
*G01F 1/667* (2022.01)
*G01F 1/66* (2022.01)

(52) U.S. Cl.
CPC .............. *G01F 1/667* (2013.01); *G01F 1/662* (2013.01)

(58) Field of Classification Search
CPC ................................. G01F 1/667; G01F 1/662
USPC ..................................................... 73/861.28
See application file for complete search history.

(56) References Cited

U.S. PATENT DOCUMENTS

| | | | |
|---|---|---|---|
| 7,096,135 B2 * | 8/2006 | Ao ........................... | G01F 1/667 |
| | | | 73/861.27 |
| 2003/0172743 A1 | 9/2003 | Ao et al. | |
| 2004/0123666 A1 * | 7/2004 | Ao ........................ | G10K 11/165 |
| | | | 73/644 |
| 2005/0209795 A1 | 9/2005 | Ao et al. | |
| 2008/0163700 A1 * | 7/2008 | Huang ................. | G01B 17/025 |
| | | | 73/861.25 |
| 2016/0069718 A1 * | 3/2016 | Wandeler .................. | G01F 1/66 |
| | | | 73/861.28 |
| 2019/0033261 A1 * | 1/2019 | Nielsen ................ | G01N 29/222 |

FOREIGN PATENT DOCUMENTS

| | | |
|---|---|---|
| DE | 196 26 865 A1 | 1/1998 |
| DE | 10 2005 033 865 A1 | 1/2007 |
| DE | 10 2012 112 516 A1 | 6/2014 |
| EP | 3521773 A1 | 8/2019 |

* cited by examiner

*Primary Examiner* — Nathaniel T Woodward
(74) *Attorney, Agent, or Firm* — Muncy, Geissler, Olds & Lowe, P.C.

(57) ABSTRACT

A method for operating an ultrasonic flowmeter includes the steps of: emitting a measuring signal having a first part that propagates as an interference signal along and/or within a wall of a measuring tube, and a second part that propagates as a useful signal through a medium flowing through the measuring tube; receiving the interference signal and the useful signal; determining an interference amplitude of the interference signal and determining a useful amplitude of the useful signal; determining an amplitude ratio of the useful amplitude and the interference amplitude; and providing a message if the amplitude ratio falls below a specified lower limit value or exceeds a specified upper limit value. A related ultrasonic flowmeter is also disclosed.

14 Claims, 3 Drawing Sheets

METHOD FOR OPERATING AN ULTRASONIC FLOWMETER AND ULTRASONIC FLOWMETER

TECHNICAL FIELD

The invention is based on a method for operating an ultrasonic flowmeter, wherein the ultrasonic flowmeter comprises at least one first ultrasonic transducer, at least one second ultrasonic transducer, at least one measuring tube with a measuring tube wall and at least one control and evaluation unit, wherein the first ultrasonic transducer is designed at least for emitting a measuring signal and wherein the second ultrasonic transducer is designed at least for receiving the measuring signal, wherein the first ultrasonic transducer and the second ultrasonic transducer are arranged on the measuring tube and wherein a medium to be measured flows through the measuring tube during operation.

Furthermore, the invention relates to an ultrasonic flowmeter with at least one first ultrasonic transducer, with at least one second ultrasonic transducer, with at least one measuring tube with a measuring tube wall and with at least one control and evaluation unit, wherein the first ultrasonic transducer is designed at least for emitting a measuring signal and wherein the second ultrasonic transducer is designed at least for receiving the measuring signal, wherein the first ultrasonic transducer and the second ultrasonic transducer are arranged on the measuring tube and wherein a medium to be measured flows through the measuring tube during operation.

BACKGROUND

The accuracy of ultrasonic flowmeters known from the prior art depends, among other things, on how well, i.e. how accurately, a measurement signal emitted by a first ultrasonic transducer can be captured by a second ultrasonic transducer. To determine the transit time of the measuring signal as accurately as possible, it is important to be able to distinguish the beginning of the measuring signal from interference signals as effectively as possible.

A measuring signal emitted by a first ultrasonic transducer is not only transmitted via the medium to the second ultrasonic transducer during operation. Part of the measuring signal also reaches the second ultrasonic transducer via the measuring tube and is captured there as an interference signal. Since the interference signal is reflected many times inside the measuring tube wall, part of the interference signal reaches the second ultrasonic transducer at the same time as and/or temporally after the useful signal. In addition, part of the interference signal reaches the second ultrasonic transducer before the useful signal because the speed of sound in the measuring tube is higher than in the medium. Due to the temporal expansion of the interference signal at the second ultrasonic transducer, the useful signal is always superimposed by an interference signal.

Thus, when the useful signal captured at the second ultrasonic transducer is referred to in the context of the present invention, this is always to be understood as a superposition of the actual useful signal and the interference signal arriving at the same time as the useful signal.

An ultrasonic flowmeter and a method for operating an ultrasonic flowmeter are known from EP 0 9499 485 A1, wherein a digital amplitude signal is determined in knowing the process parameters and is fed to an amplitude filter. The amplitude filter is then used to determine the transit time of the measuring signal.

SUMMARY

Based on the prior art described, it is an object of the present invention to provide a method for operating an ultrasonic flowmeter and an ultrasonic flowmeter that ensures an improvement of the ultrasonic flowmeter.

According to a first teaching of the invention, the aforementioned object is achieved by a method described at the beginning, in that the method comprises the following steps during a measurement:

emitting a measuring signal by the first ultrasonic transducer, wherein a first part of the measuring signal propagates as an interference signal along and/or inside the measuring tube wall and wherein a second part of the measuring signal propagates as a useful signal through the medium, receiving the interference signal and the useful signal by the second ultrasonic transducer and forwarding the interference signal and the useful signal to the control and evaluation unit, determining an interference amplitude of the interference signal and determining a useful amplitude of the useful signal by the control and evaluation unit, determining the amplitude ratio of the useful amplitude and the interference amplitude, providing a message if the amplitude ratio falls below a fixed lower limit value or exceeds a fixed upper limit value.

According to the invention, it has been recognized that a measure of the accuracy of the ultrasonic flowmeter is the amplitude ratio between the useful signal and the interference signal. The more the useful signal differs from the interference signal, the better, i.e. the more accurate, the actual useful signal can be separated from the interference signal. Basically, the useful signal differs from the interfering signal due to the shape and/or the frequency and/or the height of the peaks, so that the useful signal can be separated from the interference signal based on the previously mentioned parameters.

By forming the amplitude ratio from measured values, all fluctuations of process parameters that have an influence on the interfering signal and/or the useful signal are always taken into account. The method according to the invention is particularly advantageous compared to methods which theoretically predict the interference signal and/or an attenuation of the useful amplitude on the basis of process parameters. This is because, on the one hand, it is not necessary to capture additional process parameters in order to determine the interference amplitude. On the other hand, it is ensured that all parameters that influence the interference signal and/or the useful signal are actually captured automatically. As a result, the measurement accuracy or the measurement deviation or a measure of the measurement deviation of the measured transit time of the useful signal can be specified particularly accurately due to the superimposition by the interference signal.

A message is provided if the ratio of useful amplitude to interference amplitude falls below a specified lower limit value or if the ratio of interference amplitude to useful amplitude exceeds a specified upper limit value.

According to a first design of the method, the interference amplitude is determined from the interference signal lying temporally before the useful signal or from the interference signal lying temporally after the useful signal.

As explained above, the interference signal arrives at the second ultrasonic transducer both temporally before the useful signal and furthermore continues after the useful signal arrives. According to one design, the amplitude of the interference signal increases as time progresses.

Since the magnitude of the interference amplitude of the interference signal arriving at the second ultrasonic transducer exactly at the time of arrival of the useful signal is particularly relevant, according to one design the interference amplitude is corrected with a correction factor to determine the amplitude ratio. If the interference amplitude is determined from an interference signal which arrives at the second ultrasonic transducer before the useful signal, the correction factor is preferably greater than 1. If the interference amplitude is determined from an interference signal which arrives at the second ultrasonic transducer after the useful signal, the correction factor is preferably less than 1.

Particularly preferably, the course of the interference signal is captured and analyzed separately before the measurement, i.e. without the presence of the useful signal. For example, the useful signal is blocked so that it does not reach the second ultrasonic transducer. Based on the captured course of the interference signal, a correction factor is determined according to one design. Particularly preferably, a first correction factor is determined in the case that the interference amplitude from the interference signal that hits the second ultrasonic transducer temporally before the useful signal is determined, and a second correction factor is further determined in the case that the interference amplitude from the interference signal that hits the second ultrasonic transducer temporally after the useful signal is determined.

According to a further design of the method, the amplitude of the interference signal is averaged over a plurality of peaks to determine the interference amplitude. This design has the advantage that the background noise of the interference signal is averaged out. It is particularly advantageous if the peaks to be averaged are as close as possible to the useful signal. This means that the error in determining the amplitude ratio is particularly small, since the interference amplitude corresponds as closely as possible to the interference amplitude that hits the second ultrasonic transducer at the same time as the actual useful signal. For example, the average is taken over a fixed period of time before the useful signal arrives. Preferably, averaging is performed over a period of at least 50 µs, particularly preferably at least 100 µs, especially at least 150 µs before the useful signal arrives.

According to a likewise preferred design of the method, the amplitude of the useful signal is averaged over a plurality of peaks to determine the useful amplitude. Preferably, it is averaged over at least two peaks, more preferably over at least four peaks, in particular over at least six peaks.

According to a further design, the useful amplitude and/or the interference amplitude corresponds to the peak-to-peak amplitude around a zero crossing of an interference signal or a useful signal. For determining the interference amplitude, the zero crossing at the arrival of the useful signal is not selected for this purpose. This design ensures that the amplitude determination, in particular of the useful signal, is particularly accurate, since the height of the individual peaks of the useful signal changes immediately after the arrival of the useful signal. Particularly preferably, therefore, the useful amplitude corresponds to the peak-to-peak amplitude of the first peak of the useful signal, viewed in time. This is particularly advantageous if the transit time of the useful signal exhibits a random variation.

Alternatively, instead of a peak-to-peak amplitude, the useful amplitude and/or the interference amplitude may correspond to the amplitude of a peak starting from the zero line of the interference signal or the useful signal. It is also conceivable to average a plurality of such amplitudes starting from the zero line to determine the interference amplitude or the useful amplitude.

According to a further preferred design, the envelope of a time-limited interference signal or a time-limited useful signal is determined for determining the useful amplitude and/or the interference amplitude, wherein the interference amplitude is the maximum of the envelope of the time-limited interference signal and/or wherein the useful amplitude is the maximum of the envelope of the time-limited useful signal.

Particularly preferably, the interference amplitude is simply equal to the maximum peak-to-peak amplitude within a specified first time period and/or the useful amplitude is equal to the maximum peak-to-peak amplitude within a specified second time period.

During operation, the useful signal may exhibit a random time offset due to variations in sound velocity and/or flow rate. This random time offset is referred to as jitter. The random time offset results in a variation of the phase relationship between the useful signal and the disturbance signal, so that the useful signal is partly constructively and partly destructively superimposed by the disturbance signal. As a result, the measured propagation time of the useful signal also varies.

This random time offset can also be used to reduce the measurement deviation caused by the interference signal, in particular by averaging.

According to one design, the measured useful signal, which is both superimposed by the interference signal and has a random time offset (jitter), is averaged over a plurality of measurements. Due to the partly constructive, partly destructive superposition, the measurement error caused by the interference signal is reduced overall by the averaging. As a consequence, the measurement accuracy of the flowmeter is improved.

According to a next design, the random time offset of the useful signal is determined and the ratio of useful signal and interference signal is compensated by this time offset. For example, to determine the time offset, the standard deviation of the measured propagation time over a plurality of measurements is determined. When determining the interference amplitude and/or the useful amplitude, the measured time offset is taken into account by suitable selection of, for example, the interference signal and/or useful signal to be averaged. In this respect, an error attributable to this random time offset can be avoided or at least reduced when forming the amplitude ratio.

According to a further preferred design, the measured useful signal is taken as time base, i.e. kept stationary in relation to the interfering signal, so that from this point of view the interfering signal has a random time offset. If the interfering signal is now averaged over a plurality of measurements, the interference amplitude and thus the measurement error caused by the interfering signal can be further reduced.

According to a next design of the method, the providing of a message is to be understood as the output and/or the forwarding and/or the display of a message. For example, the user may be informed that the accuracy of the flowmeter is low due to the amplitude ratio being too low or too high.

In addition, the information of the too low or too high amplitude ratio can also be used to trigger further measures. For example, falling below a lower limit value or exceeding an upper limit value can be an indication that at least one process parameter is fluctuating strongly. According to one design, falling below a lower limit value or exceeding an upper limit value can thus serve as a trigger for capturing and/or controlling at least one process parameter, such as pressure or temperature. Likewise, falling below a lower limit value or exceeding an upper limit value can be an indication that the useful signal is no longer optimally incident on the second ultrasonic transducer due to a speed of the medium to be measured that is too high or too low.

According to a second teaching of the present invention, the aforementioned object is achieved by an ultrasonic flowmeter described at the outset in that the control and evaluation unit is designed and set up to perform one of the methods described above.

BRIEF DESCRIPTION OF THE DRAWINGS

There is now a large number of possibilities for designing and further developing the method according to the invention and the flowmeter according to the invention. For this purpose, reference is made to the following description of preferred embodiments together with the drawings.

DETAILED DESCRIPTION

Figure 1:
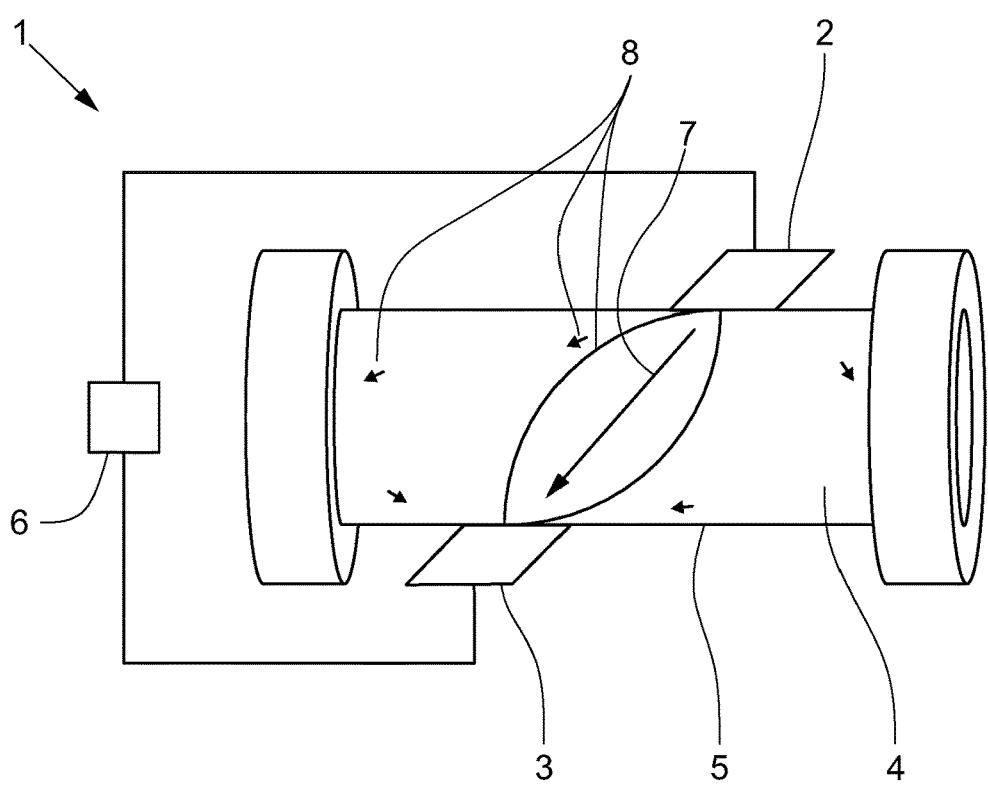
FIG. 1 illustrates a first embodiment of an ultrasonic flowmeter.

FIG. 1 shows a first embodiment of an ultrasonic flowmeter 1 designed and set up to perform a method according to the invention. The ultrasonic flowmeter 1 comprises a first ultrasonic transducer 2, a second ultrasonic transducer 3, a measuring tube 4 with a measuring tube wall 5 and a control and evaluation unit 6.

The first ultrasonic transducer 2 and the second ultrasonic transducer 3 are arranged offset on the measuring pipe as seen in the direction of flow of a medium in such a way that a measuring signal emitted by the first ultrasonic transducer 2 reaches the second ultrasonic transducer 3 after passing through the medium.

The second ultrasonic transducer 3 is designed to receive the measuring signal. In a second measurement, the second ultrasonic transducer 3 sends a measuring signal in the direction of the first ultrasonic transducer 2. In this measurement situation, the first ultrasonic transducer 2 is designed to receive the measuring signal.

Furthermore, a control and evaluation unit 6 is provided, which is connected to the first ultrasonic transducer 2 and the second ultrasonic transducer 3.

If, during operation, the first ultrasonic transducer 2 sends a measuring signal in the direction of the second ultrasonic transducer 3, the measuring signal propagates on the one hand as a useful signal 7 through the inside of the measuring tube and, on the other hand, as an interference signal 8 via the wall of the measuring tube 5.

At the second ultrasonic transducer 3, the interference signal 8 is then superimposed on the useful signal 7 during operation, which makes it more difficult to capture the useful signal 7 accurately and thus has a negative effect on the measurement accuracy.

The ultrasonic flowmeter 1 is therefore set up in such a way that it allows real-time assessment of the measurement accuracy during operation by means of the method according to the invention.

Figure 2:
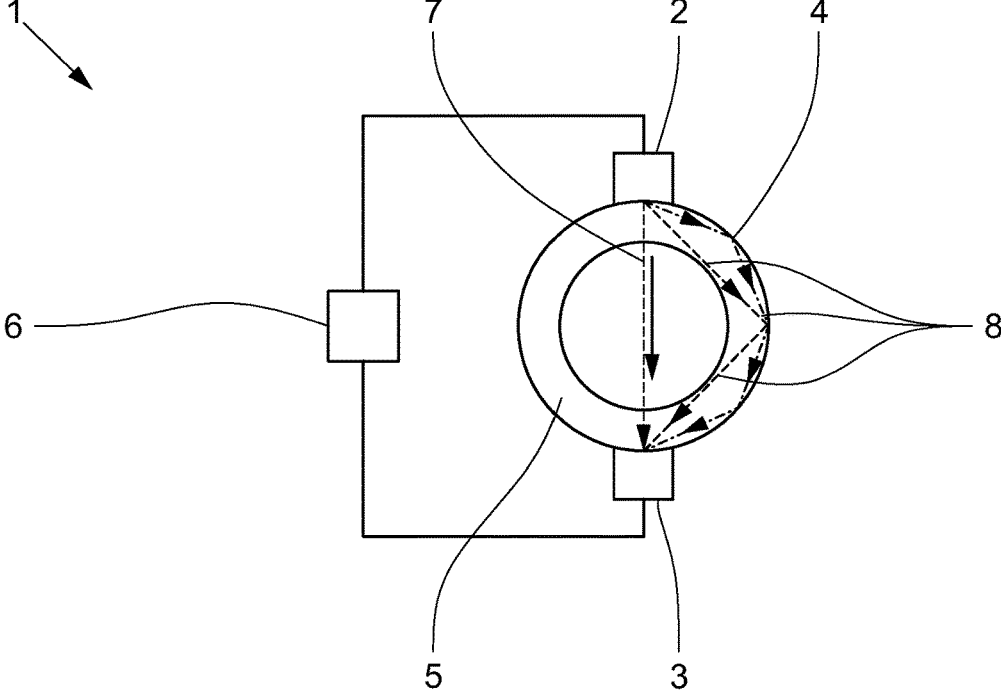
FIG. 2 illustrates the embodiment shown in FIG. 1 in axial plan view of the measuring tube.

FIG. 2 shows the ultrasonic flowmeter 1, in detail the measuring tube 4 in axial plan view. It can be seen that the ultrasonic transducers 2, 3 are arranged on the measuring tube wall 5. The ultrasonic flowmeter 1 shown is thus designed as a clamp-on flowmeter.

Furthermore, it is shown how the measuring signal emitted by the first ultrasonic transducer 2 continues as a useful signal 7 through the interior of the measuring tube and as an interference signal 8 along the measuring tube wall 5. Inside the measuring tube wall 5, the interference signal 8 is reflected several times so that it arrives at the second ultrasonic transducer 3 both temporally before the useful signal 7 and also continues temporally over the useful signal 7.

Figure 3:
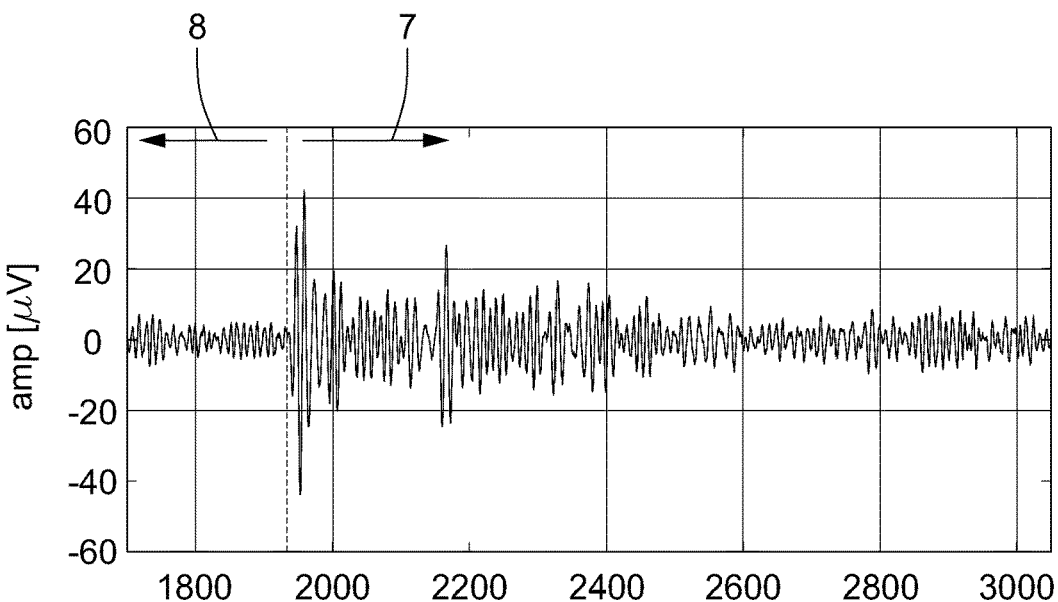
FIG. 3 illustrates a measuring signal received at the second ultrasonic transducer.

FIG. 3 shows a measurement signal received by the second ultrasonic transducer 3 comprising a useful signal 7 and an interference signal 8. According to an embodiment of the method according to the invention, the interference amplitude is determined from the interference signal 8 which is present at the second ultrasonic transducer 3 before the useful signal 7. Likewise, the interference amplitude can be determined from the interference signal 8 that is applied to the ultrasonic transducer 3 temporally after the useful signal 7.

Figure 4:
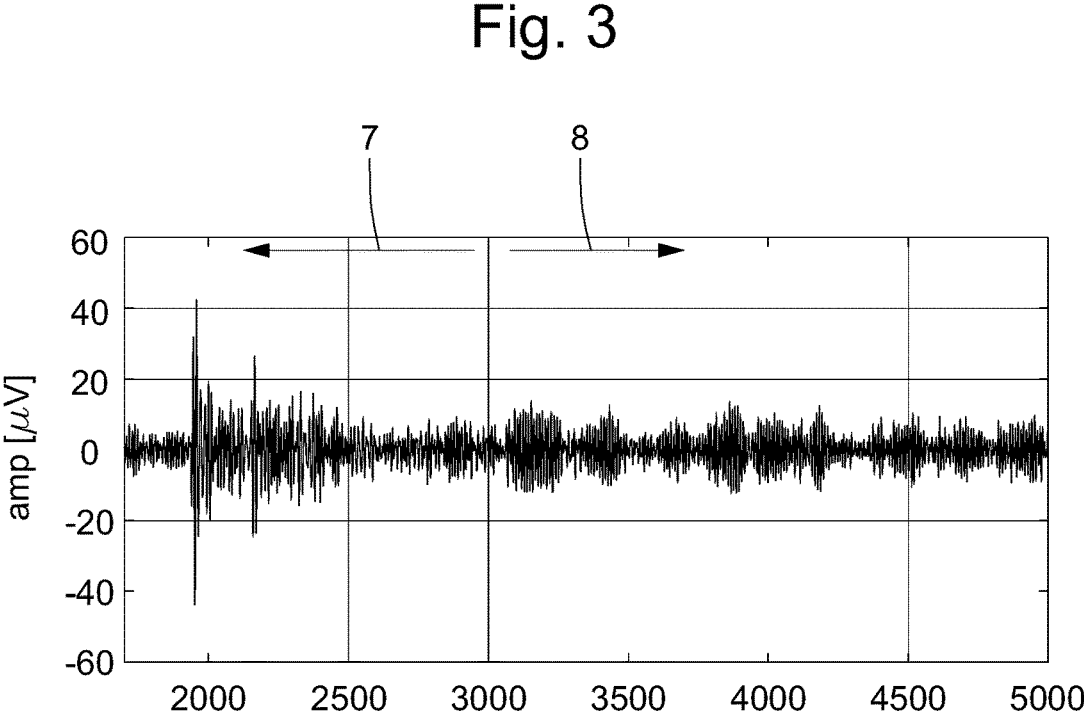
FIG. 4 illustrates another measuring signal received at the second ultrasonic transducer.

FIG. 4 shows a further measuring signal received by the second ultrasonic transducer 3 comprising a useful signal 7 and an interference signal 8. In the embodiment shown, the interference amplitude is determined from the interference signal 8 which is present at the second ultrasonic transducer 3 temporally after the useful signal 7.

Figure 5:
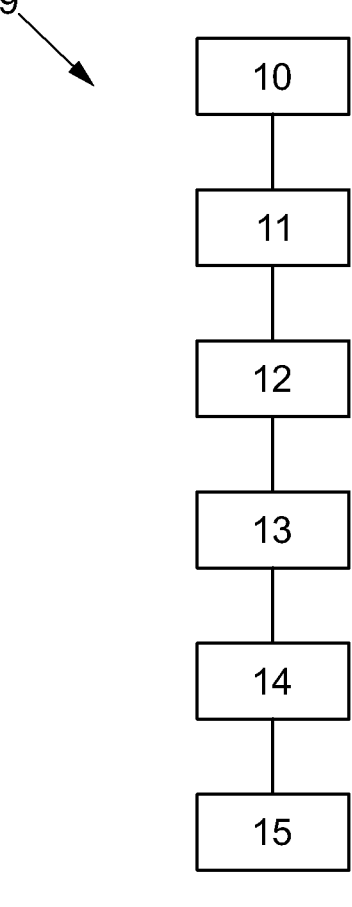
FIG. 5 illustrates an embodiment of the method for operating an ultrasonic flowmeter.

FIG. 5 shows a first embodiment of a method 9 according to the invention for operating an ultrasonic flowmeter 1. The ultrasonic flowmeter 1 is designed as shown in FIG. 1.

In a first step 10, the first ultrasonic transducer 2 transmits a measuring signal in the direction of the second ultrasonic transducer 3. A first part of the measuring signal propagates as an interference signal 8 along and/or within the measuring tube wall 5, a second part of the measuring signal propagates as a useful signal 7 through the medium.

In a next step 11, the second ultrasonic transducer 3 receives the interference signal 8 and the useful signal 7 and forwards the interference signal 8 and the useful signal 7 to the control and evaluation unit 6.

In a next step 12, the control and evaluation unit determines the interference amplitude of the interference signal 8 and the useful amplitude of the useful signal 7. The determination of the interference amplitude and the useful amplitude can be carried out according to all the variations described above.

Then, the control and evaluation unit 6 determines 13 the amplitude ratio of useful amplitude and interference amplitude.

If the amplitude ratio falls below or exceeds a previously defined limit value, a message is output, in particular in the form of a message to the user 14, so that the user is informed that the measurement accuracy is currently decreased.

In addition, a check of further process parameters can optionally be performed 15.

As a result, the method 9 shown for operating an ultrasonic flowmeter 1 has an improvement in that the determination of the measurement deviation caused by an interference signal can be monitored online, so that measures for correcting the increased measurement deviation can be taken immediately or at an early stage.

The invention claimed is:

1. A method for operating an ultrasonic flowmeter, wherein the ultrasonic flowmeter has at least one first ultrasonic transducer, at least one second ultrasonic transducer, at least one measuring tube with a measuring tube wall and at least one control and evaluation unit, wherein the first ultrasonic transducer is designed at least for emitting a measuring signal and wherein the second ultrasonic transducer is designed at least for receiving the measuring signal, wherein the first ultrasonic transducer and the second ultrasonic transducer are arranged on the measuring tube and wherein a medium to be measured flows through the measuring tube during operation, wherein, during a measurement, the method comprises the following steps:

emitting a measuring signal by the first ultrasonic transducer, wherein a first part of the measuring signal propagates as an interference signal along and/or within the measuring tube wall and wherein a second part of the measuring signal propagates as a useful signal through the medium;

receiving the interference signal and the useful signal by the second ultrasonic transducer and forwarding the interference signal and the useful signal to the control and evaluation unit;

determining an interference amplitude of the interference signal and determining a useful amplitude of the useful signal by the control and evaluation unit;

determining an amplitude ratio of the useful amplitude and the interference amplitude; and providing a message if the amplitude ratio falls below a specified lower limit value or exceeds a specified upper limit value;

wherein the method further comprises one of:

averaging the amplitude of the interference signal over a plurality of peaks in order to determine the interference amplitude; and averaging the received useful signal over a plurality of measurements so that a randomly present time offset between the useful signal and the interference signal is averaged out, and selecting the respective useful signals of a measurement as a time base, so that the interference signal has a randomly present time offset, and averaging the interference signal over a plurality of measurements, so that the interference amplitude is reduced.

2. The method according to claim 1, wherein the interference amplitude is determined from the interference signal lying temporally before the useful signal or from the interference signal lying temporally after the useful signal.

3. The method according to claim 1, wherein, in order to determine the amplitude ratio, the interference amplitude is corrected by a correction factor which takes into account that the determined interference amplitude does not correspond to the desired interference amplitude which impinges on the second ultrasonic transducer at the same time as the useful signal.

4. The method according to claim 1, wherein the amplitude of the useful signal is averaged over a plurality of peaks to determine the useful amplitude.

5. The method according to claim 1, wherein the useful amplitude and/or the interference amplitude corresponds to a peak-to-peak amplitude around a zero crossing of the interference signal or the useful signal.

6. The method according to claim 1, wherein, in order to determine the useful amplitude and/or the interference amplitude, an envelope of a time-limited interference signal or of a time-limited useful signal is determined; and wherein the interference amplitude is a maximum of the envelope of the time-limited interference signal and/or wherein the useful amplitude is the maximum of the envelope of the time-limited useful signal.

7. The method according to claim 1, wherein the step of providing the message involves outputting and/or forwarding and/or displaying of a message.

8. An ultrasonic flowmeter, comprising:

at least one first ultrasonic transducer at least one second ultrasonic transducer;

at least one measuring tube with a measuring tube wall; and at least one control and evaluation unit;

wherein the first ultrasonic transducer is designed at least for emitting a measuring signal and wherein the second ultrasonic transducer is designed at least for receiving the measuring signal;

wherein the first ultrasonic transducer and the second ultrasonic transducer are arranged on the measuring tube;

wherein a medium to be measured flows through the measuring tube during operation; and wherein the control and evaluation unit is designed to:

determine an interference amplitude of a first part of the measuring signal that propagates as an interference signal along and/or within the measuring tube wall;

determine a useful amplitude of a second part of the measuring signal that propagates as a useful signal through the medium;

determine an amplitude ratio of the useful amplitude and the interference amplitude; and provide a message if the amplitude ratio falls below a specified lower limit value or exceeds a specified upper limit value;

wherein the control and evaluation unit is further designed to one of:

average the amplitude of the interference signal over a plurality of peaks in order to determine the interference amplitude; and average the received useful signal over a plurality of measurements so that a randomly present time offset between the useful signal and the interference signal is averaged out, and select the respective useful signals of a measurement as a time base, so that the interference signal has a randomly present time offset, and average the interference signal over a plurality of measurements, so that the interference amplitude is reduced.

9. The ultrasonic flowmeter according to claim 8, wherein the interference amplitude is determined from the interference signal lying temporally before the useful signal or from the interference signal lying temporally after the useful signal.

10. The ultrasonic flowmeter according to claim 8, wherein, in order to determine the amplitude ratio, the interference amplitude is corrected by a correction factor which takes into account that the determined interference amplitude does not correspond to the desired interference amplitude which impinges on the second ultrasonic transducer at the same time as the useful signal.

11. The ultrasonic flowmeter according to claim 8, wherein the amplitude of the useful signal is averaged over a plurality of peaks to determine the useful amplitude.

12. The ultrasonic flowmeter according to claim 8, wherein the useful amplitude and/or the interference amplitude corresponds to a peak-to-peak amplitude around a zero crossing of the interference signal or the useful signal.

13. The ultrasonic flowmeter according to claim 8, wherein, in order to determine the useful amplitude and/or the interference amplitude, an envelope of a time-limited interference signal or of a time-limited useful signal is determined; and wherein the interference amplitude is a maximum of the envelope of the time-limited interference signal and/or wherein the useful amplitude is the maximum of the envelope of the time-limited useful signal.

14. The ultrasonic flowmeter according to claim 8, wherein the control and evaluation unit is designed to provide the message by outputting the message and/or forwarding the message and/or displaying the message.

\* \* \* \* \*